United States Patent Office 2,859,188
Patented Nov. 4, 1958

2,859,188

HEXAHYDROBENZOGUANAMINE OIL MODIFIED ALKYD COATING COMPOSITIONS

Rudolph L. Heider, Springfield, Mass., and Harry M. Walker, Dickinson, Tex., assignors to Monsanto Chemical Company, St. Louis, Mo., a corporation of Delaware No Drawing. Application November 26, 1956
Serial No. 624,212

9 Claims. (Cl. 260—21)

This invention relates to surface coating compositions. More particularly, the invention relates to coating compositions comprising alkyd resins modified with etherified hexahydrobenzo-guanamine-aldehyde resins.

Melamine resins have been used to modify the characteristics of alkyd resin coating compositions and have been successful in improving the rate of cure, color retention, chemical resistance, and exterior durability of such compositions. However, the known etherified melamine-formaldehyde resins offer the choice of high cure response with limited alkyd compatibility or lower cure response with wider alkyd compatibility and decreased detergent resistance. The former group, more important commercially, decrease the stability of high acid number alkyds, impair the gloss of alkyd resin coatings, and cause a tendency to brittleness of the modified films.

One object of this invention is to provide new surface coating compositions.

Another object is to provide modified alkyd resin coating compositions.

Another object is to provide coating compositions comprising alkyd resins modified with etherified hexahydrobenzoguanamine-aldehyde resins.

Another object is to provide a substituted triazine based surface coating resin of superior gloss, cure, and detergent resistance which also possesses exterior durability equivalent to melamine.

A further object is to provide resins having increased compatibility with alkyd resins of long oil lengths.

These and other objects are attained by incorporating etherified hexahydrobenzoguanamine-aldehyde resins into alkyd resin coating compositions.

The following examples are given to illustrate the invention.

*Example I*

A reaction vessel is charged with a mixture of 1 mol of hexahydrobenzoguanamine, 4 mols of formalin (37% formaldehyde), 6 mols of butanol, and 11 mols of water. The pH is adjusted to 8.5 with 5% aqueous sodium hydroxide. The mixture is refluxed for 30 minutes at atmospheric pressure. The resulting clear solution is acidified to a pH of 5.6 with oxalic acid and the water removed by azeotropic distillation with butanol, again at atmospheric pressure. The methylol hexahydrobenzoguanamine is etherified and resinified during the process of azeotropic distillation. The solution is then concentrated under a vacuum of about 100 mm. of mercury to the desired solids content. The product is a clear, colorless solution of butylated-hexahydrobenzoguanamine-formaldehyde resin in butanol. It can be applied to various surfaces and cured to form hard, brittle films having a high gloss.

*Example II*

The butylated-hexahydrobenzoguanamine-formaldehyde resin of Example I is used in making a pigmented enamel having the following formulation:

| | Parts by weight |
|---|---|
| Alkyd resin | 20 |
| Resin of Example I (by solids) | 10 |
| Titanium dioxide | 25 |
| Xylol | 40 |
| Butanol | 5 |

The alkyd resin is a coconut oil-modified glyceryl phthalate resin containing 33% by weight of combined fatty acids. The enamel is sprayed onto a steel panel and baked at temperatures of 180°–450° F. for 60–5 minutes. The resulting film has a Sward hardness of 62 and is also characterized by good properties of gloss, chemical resistance, exterior durability, and color retention.

*Example III*

An enamel is prepared according to the following formula:

| | Parts by weight |
|---|---|
| Alkyd resin | 15.0 |
| Resin of Example I (by solids) | 15.0 |
| Rutile titanium dioxide | 15.0 |
| Lampblack | 0.2 |
| Xylol | 50.0 |
| Butanol | 4.8 |

The alkyd resin is a soybean oil-modified glyceryl phthalate resin containing about 41% by weight of combined fatty acids. The enamel is sprayed onto a steel panel and baked at temperatures of 180°–450° F. for 60–5 minutes to produce a hard film having high gloss and good properties of color retention and detergent resistance.

*Example IV*

An unpigmented, clear baking varnish is prepared according to the following formula:

| | Parts by weight |
|---|---|
| Alkyd resin | 27.00 |
| Resin of Example I (by solids) | 3.00 |
| Hydrocarbon solvent | 50.00 |
| Butanol | 5.00 |
| Cobalt naphthenate | 0.06 |

The alkyd resin is a soybean oil-modified glyceryl phthalate resin containing about 62% by weight of combined fatty acids. The hydrocarbon solvent is a commercial mixture of petroleum aliphatic hydrocarbons. The varnish is sprayed onto a steel panel and baked at about 180°–450° F. for 60–5 minutes to produce a hard film having high gloss and good properties of detergent resistance and resistance to yellowing.

The etherified hexahydrobenzoguanamine-aldehyde resins which are used to modify alkyd resins in making the improved compositions of this invention are heat reaction products of from 3 to 6 molar proportions of a saturated monocarbonyl aldehyde containing 1–4 carbon atoms, from 3 to 10 molar proportions of a saturated monohydric alcohol containing 1–6 carbon atoms, and 1 molar proportion of hexahydrobenzoguanamine. These resins may be prepared by reacting the aldehyde and the hexahydrobenzoguanamine under alkaline conditions and then reacting the product with the alcohol under acid conditions. The resins and processes for preparing them are more completely described in our copending application, Serial No. 624,225, filed November 26, 1956.

The resin of Example I is particularly advantageous for use in modifying alkyds. The preparation of another suitable resin is illustrated in the following example.

*Example V*

A mixture of 1 mol of hexahydrobenzoguanamine, 5.3 mols of 91% aqueous para-formaldehyde, 2 mols of water, and 5 mols of methanol is refluxed for 30 minutes at a pH of 8.5 obtained with 5% aqueous sodium hydroxide. The resulting solution is acidified to a pH of 5.5 with oxalic acid and refluxed for one hour. Water is removed by a series of flash evaporations in which the wet distillate is replaced by dry methanol until the desired solids content is obtained. The product is a clear, colorless solution of methylated hexahydrobenzoguanamine-formaldehyde resin in methanol.

The coating compositions of this invention are organic solvent solutions of blends of oil-modified alkyd resins and etherified resins derived from melamine or urea in which the latter resins are replaced in whole or in part by the etherified hexahydrobenzoguanamine-aldehyde resins. The amount of etherified resin may vary from 10–50% by weight based on the weight of the alkyd resin.

The alkyd resins are polyester resins obtained by reacting polyhydric alcohols such as glycols, glycerols, sorbitol, pentaerythritol, etc., with polybasic acids such as phthalic acid, isophthalic acid, maleic acid, adipic acid, azelaic acid, sebacic acid, etc., which resins may be modified with minor amounts of saturated and unsaturated monobasic acids, saturated and unsaturated monohydric alcohols, etc. The oil-modified alkyd resins are polyester resins which have been modified with drying and semi-drying oils such as coconut oil, castor oil, soybean oil, linseed oil, tung oil, and the acids derived therefrom and the partial glycerides of the acids. Minor proportions of non-drying oils may be used as internal plasticizers. The etherified resins are particularly advantageous for use in combination with oil-modified alkyd resins containing 30–70%, and preferably 30–45%, by weight of combined oil acids.

The etherified resins derived from melamine or urea which may be blended with the alkyd resins are ethers of condensation products of melamine or urea or mixtures thereof with aldehydes. The resins may be further modified by interreaction with such materials as toluene sulfonamides, phenyl acetoguanamine, etc. For best results the hexahydrobenzoguanamine ether resin should constitute at least 50 weight percent of the two additives blended with the alkyd resin.

The mixtures of alkyd resins and etherified hexahydrobenzoguanamine-aldehyde resin are soluble in organic solvents such as hydrocarbons, alcohols, ethers, ketones, esters, and mixtures thereof; e. g., xylol-butanol and aliphatic hydrocarbon-butanol mixtures. Conventional pigments and driers such as manganese, lead, and cobalt driers may be incorporated into the compositions. The coating compositions may have a resinous solids content of 20–80%.

Various surfaces such as wood, paper, metal textiles, etc. may be coated with the compositions of this invention. Applications of the coatings may be accomplished by conventional methods; e. g., brushing, spraying, roll-coating, tumble-coating, etc. The coatings are cured by heating at temperatures of 180°–450° F. for 60–5 minutes.

The coating compositions of this invention are superior in many properties to the alkyd resin coating compositions which are modified with other aminoplast resins. Of great importance is the combination of superior exterior durability with high gloss, heretofore relatively unattainable. These coatings also possess superior color retention, resistance to yellowing, chemical resistance, and high cure response.

It is obvious that many variations may be made in the products and processes set forth above without departing from the spirit and scope of this invention.

What is claimed is:

1. A coating composition comprising an organic solution of from 50 to 90% by weight of an oil-modified alkyd resin and from 10 to 50% by weight of an etherified hexahydrobenzoguanamine-aldehyde resin; said etherified hexahydrobenzoguanamine-aldehyde resin being prepared by (1) the alkaline condensation of from 3 to 6 molar proportions of a monoalkanal containing 1–4 carbon atoms with 1 molar proportion of hexahydrobenzoguanamine and (2) subsequently reacting the condensation product with from 3 to 10 molar proportions of a monoalkanol containing 1–6 carbon atoms under acid conditions.

2. A coating composition as in claim 1 wherein the monoalkanol is formaldehyde.

3. A coating composition as in claim 1 wherein the monohydric alkanol is butanol.

4. A coating composition as in claim 1 wherein the oil-modified alkyd resin contains 30–70% by weight of combined fatty acids.

5. A coating composition as in claim 4 wherein the monoalkanal is formaldehyde and the monohydric alkanol is butanol.

6. A coating compisition as in claim 5 wherein the organic solvent is a mixture of xylol and butanol.

7. A coating composition as in claim 5 wherein the organic solvent is a mixture of aliphatic hydrocarbons and butanol.

8. A coating composition comprising a blend of an oil-modified alkyd resin and 10–50% by weight of a mixture of an etherified hexahydrobenzoguanamine-aldehyde resin and a member of the group consisting of ethers of condensation products of melamine, urea and mixtures thereof with aldehydes; said etherified hexahydrobenzoguanamine-aldehyde resin being prepared by (1) the alkaline condensation of from 3 to 6 molar proportions of a monoalkanal containing 1–4 carbon atoms with 1 molar proportion of hexahydrobenzoguanamine and (2) subsequently reacting the condensation product with from 3 to 10 molar proportions of a monoalkanol containing 1–6 carbon atoms under acid conditions.

9. A coating composition as in claim 8 wherein the monoalkanal is formaldehyde and the etherifying agent is butanol.

References Cited in the file of this patent

UNITED STATES PATENTS

| 2,197,357 | Widmer et al. | Apr. 16, 1940 |
| 2,294,590 | West | Sept. 1, 1942 |
| 2,648,642 | Spencer | Aug. 11, 1953 |
| 2,649,423 | Spencer | Aug. 18, 1953 |
| 2,761,779 | Lindenfelser et al. | Sept. 4, 1956 |